(12) United States Patent
Bartholomeusz et al.

(10) Patent No.: US 12,484,953 B2
(45) Date of Patent: Dec. 2, 2025

(54) RF MICRONEEDLE SYSTEM WITH ENHANCED COOLING

(71) Applicant: Lutronic Corporation, Gyeonggi-do (KR)

(72) Inventors: James Bartholomeusz, Beverly Hills, CA (US); Jaesung Kim, Gyeunggi-do (KR)

(73) Assignee: Lutronic Corporation, Gyeonggi-do (KR)

( * ) Notice: Subject to any disclaimer, the term of this patent is extended or adjusted under 35 U.S.C. 154(b) by 638 days.

(21) Appl. No.: 17/691,513

(22) Filed: Mar. 10, 2022

(65) Prior Publication Data

US 2023/0285071 A1    Sep. 14, 2023

(51) Int. Cl.
*A61B 18/14* (2006.01)
*A61B 18/00* (2006.01)

(52) U.S. Cl.
CPC ............ *A61B 18/1477* (2013.01); *A61B 2018/00017* (2013.01); *A61B 2018/00023* (2013.01); *A61B 2018/00029* (2013.01); *A61B 2018/0047* (2013.01); *A61B 2018/00577* (2013.01); *A61B 2018/00589* (2013.01); *A61B 2018/143* (2013.01)

(58) Field of Classification Search
CPC ............ A61B 18/1402; A61B 18/1477; A61B 2018/00017; A61B 2018/00023; A61B 2018/00029; A61B 2018/0016; A61B 2018/00196; A61B 2018/0047; A61B 2018/00577; A61B 2018/00589; A61B 2018/143; A61B 2018/1467; A61B 2018/1475
See application file for complete search history.

(56) References Cited

U.S. PATENT DOCUMENTS

| | | | |
|---|---|---|---|
| 2009/0093864 A1* | 4/2009 | Anderson | A61B 18/1477 607/99 |
| 2012/0303016 A1* | 11/2012 | Fischer | A61B 18/042 606/33 |
| 2021/0251801 A1* | 8/2021 | Ko | A61B 18/1402 |

* cited by examiner

*Primary Examiner* — Tigist S Demie
(74) *Attorney, Agent, or Firm* — Haynes and Boone, LLP

(57) ABSTRACT

An RF microneedle system is provided with a cooling duct that at least partially surrounds a circumference of a microneedle housing. Depending upon how much circumference is surrounded by the nozzle determines the cooling coverage. For example, if the nozzle surrounds the entire circumference, 360 degrees of cooling coverage is provided. In addition, the nozzle is configured to direct cooled air into at least one slot in the microneedle housing to cool the array of microneedles.

14 Claims, 6 Drawing Sheets

RF MICRONEEDLE SYSTEM WITH ENHANCED COOLING

TECHNICAL FIELD

This application relates to radio frequency (RF) microneedle systems for fractional injury, and more particularly to RF microneedle systems with enhanced cooling.

BACKGROUND

Various skin rejuvenation therapies have been developed such as to promote the growth of new collagen or to remove scarring and discoloration. For example, a chemical solution may be applied to the skin. In an alternative approach, a laser ablates the entirety of skin surface being treated. For example, a scar or uneven pigmentation may be ablated in this fashion. Since the chemical solution or laser is ablating the entire upper surface of the skin (the epidermis) being treated, these ablative treatments may be classified as a dermal peel. The injury to the upper skin layers triggers the underlying dermis to develop more collagen and thus cause beneficial tightening to address wrinkles and sagging such as caused by aging. But the cosmetic benefits of a dermal peel are also associated with risks of infection, increased healing time, and scarring.

To provide the benefits of a peel but with reduced risks, fractional dermal ablation was developed. As implied by the "fractional" designation, a fractional dermal ablation does not ablate the entire epidermis of a treatment area. For example, a laser is pulsed while scanning to form ablated columns of skin that are separated by healthy tissue. The presence of healthy, undamaged skin about each ablated column speeds healing and reduces the risk of infection. But the resulting damage to the dermis in each column of ablated tissue stimulates the growth and reorganization of collagen, which provides a beneficial rejuvenation of the skin.

Although fractional dermal treatment may rejuvenate the skin, the use of a laser may still cause unwanted side effects such as hyper or hypo pigmentation. To achieve fractional dermal ablation without these laser-induced risks, RF microneedle systems have been developed. In an RF microneedle system, a handpiece includes an array of microneedles that may be actuated to pierce the skin and extend into the dermis at a desired and controlled depth. With the microneedles extended into the targeted tissue, an RF source in the system excites the microneedles with RF energy to cause an RF current to conduct from the microneedles. The targeted tissue has an Ohmic resistance to this current that causes electrothermal damage to achieve the desired fractional ablation or injury.

When initially developed, the microneedles were uninsulated and thus ablated from the skin surface all the way to the microneedle tips. To keep the skin surface (the epidermis) from excessive heat injury thus required aggressive cooling approaches such as a cooled metal template or housing through which the microneedles extended. To address this undesired heat injury to the epidermis, RF microneedle systems were developed in which the microneedles had insulated shafts such that the RF energy was delivered at a conductive tip of each microneedle. Since the fractional electrothermal damage is then concentrated around the microneedle tips as inserted into the dermis, the need for aggressive cooling of the skin surface was reduced.

Although insulated microneedle arrays no longer heat the epidermis, the RF excitation of the microneedles heats the microneedles. But existing cooling techniques such as a cooled metal housing do not address the microneedle heating. There is thus a need in the art for RF microneedle systems with improved cooling.

SUMMARY

In accordance with a first aspect of the disclosure, an RF microneedle system is provided that includes: a handpiece including a microneedle housing at a distal end of the handpiece, the microneedle housing including an interior containing an array of microneedles; and a nozzle configured to at least partially surround a circumference of the microneedle housing, wherein a distal portion of the microneedle housing distally extends from the nozzle and includes at least one slot configured to open to the interior containing the array of microneedles and wherein the nozzle includes a lumen extending from a proximal end of the nozzle to an at least one opening at a distal end of the nozzle.

In accordance with a second aspect of the disclosure, a method of cooling an RF microneedle system is provided that includes: driving a cooled gas into a distal end of cooling duct; and driving the cooled gas from a distal end of the cooling duct into a lumen of a nozzle to cause the cooled gas to exit a distal end of the nozzle that circumferentially surrounds a microneedle housing.

In accordance with a third aspect of the disclosure, an RF microneedle system is provided that includes: a microneedle housing including a distal portion and a proximal portion; and a nozzle configured to surround a circumference of the proximal portion of microneedle housing, wherein the distal portion of the microneedle housing extends from a distal end of the nozzle, and wherein the nozzle includes a circumferential opening at the distal end of the nozzle.

These and other advantageous features may be better appreciated through the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

An RF microneedle system is disclosed in which a cooling duct attaches to a microneedle handpiece. The handpiece includes a microneedle housing including an array of microneedles. A cooled gas supply (e.g., a cooled air supply) supplies cooled gas through the cooling duct to a nozzle that at least partially wraps a base portion of the microneedle housing. A distal portion of the microneedle housing extends from the base portion to a template that includes a perforation or hole for each microneedle in the array. In a default (non-actuated) state, the array of microneedles is contained within the housing. Conversely, each microneedle extends distally from its corresponding hole in the template in an actuated state.

The distal portion of the housing includes at least one slot or perforation that may extend from a proximal end of the distal portion to the template. The slot thus runs in a longitudinal direction with respect to the microneedle handpiece. The slot communicates with an interior of the housing that holds the array of microneedles in the non-actuated position. The cooled gas (e.g., cooled air) from the nozzle is thus at least partially directed through the at least one slot into the housing interior to chill the microneedles. This is quite advantageous as compared to traditional methods such as cooling the template. Although the microneedles pass through their respective holes in the template when actuated, there is no direct contact between the template and the microneedles. The traditional cooling of the template thus does not directly cool the microneedles. This is problematic in that the microneedles are heated from the RF excitation during treatment. In contrast, the cooling duct nozzle disclosed herein not only directs cooled gas longitudinally from the distal portion of the microneedle housing to cool the epidermis but also into the microneedle housing to cool the microneedles. In this fashion, the skin may be cooled to reduce discomfort during the RF microneedle treatment simultaneously with cooling the array of microneedles.

Figure 1A:
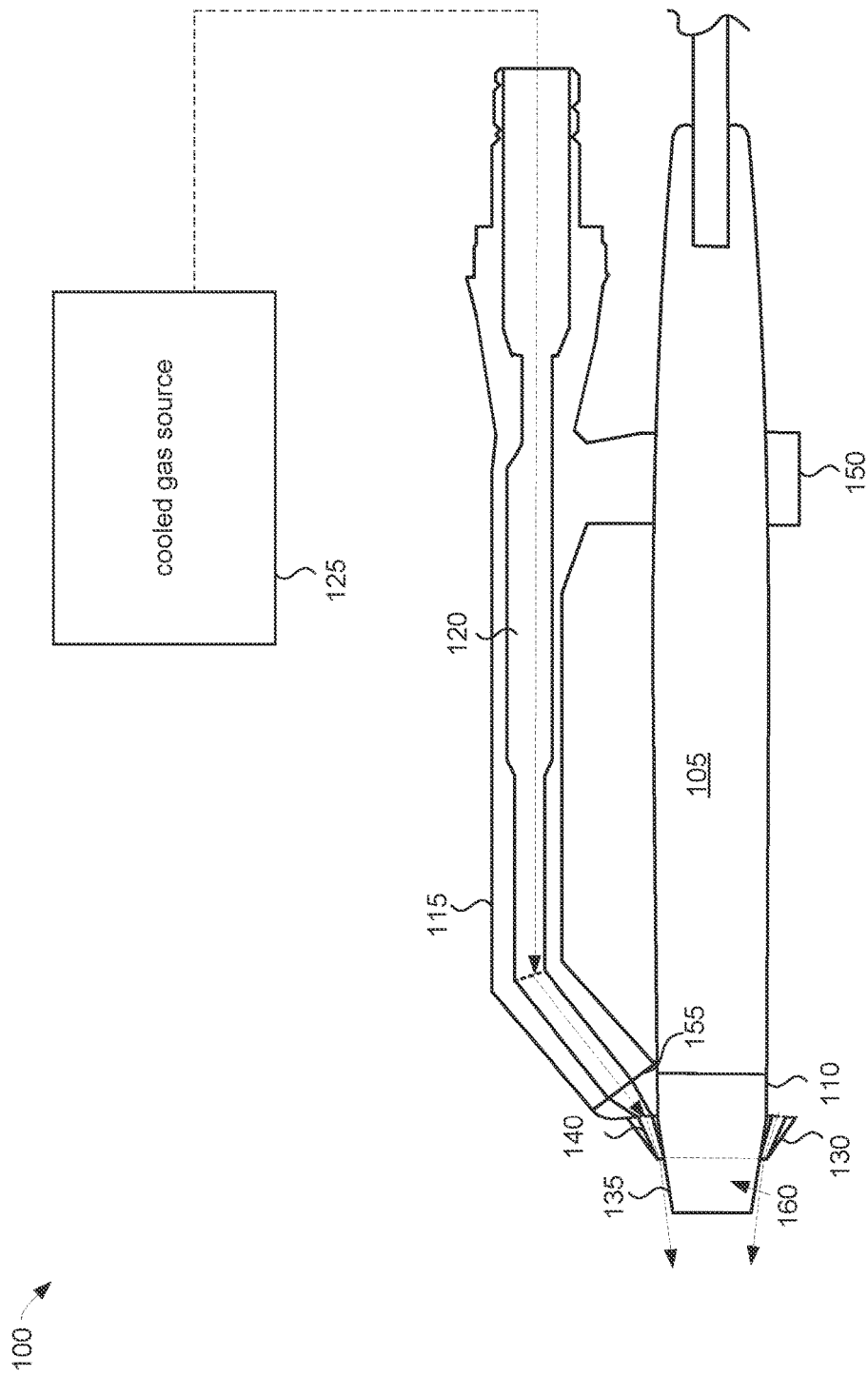
FIG. 1A is a longitudinal cross-sectional view of an RF microneedle system with 360 degrees of cooling in accordance with an aspect of the disclosure.
Figure 1B:
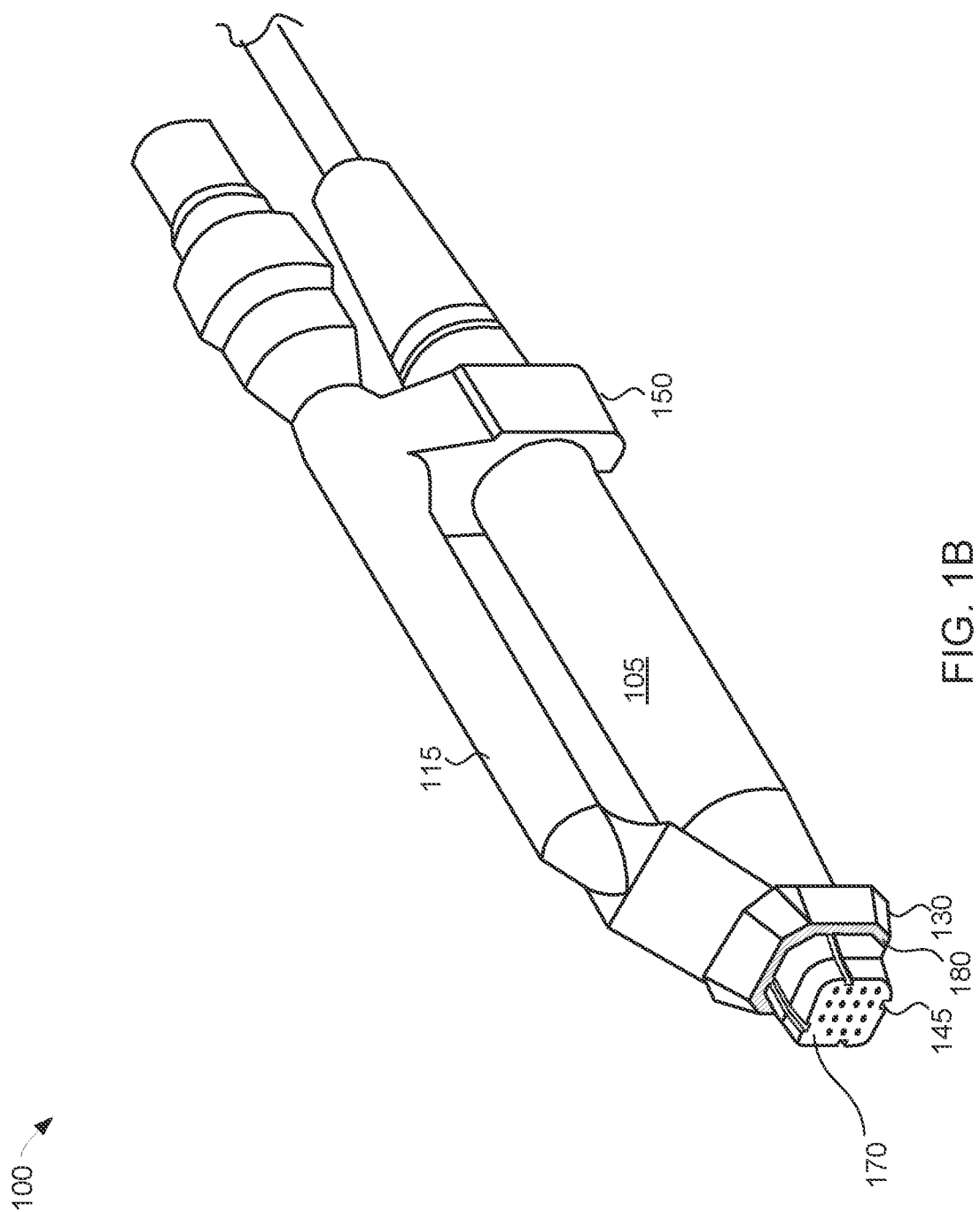
FIG. 1B is a perspective view of an RF microneedle system of FIG. 1A.
Figure 1C:
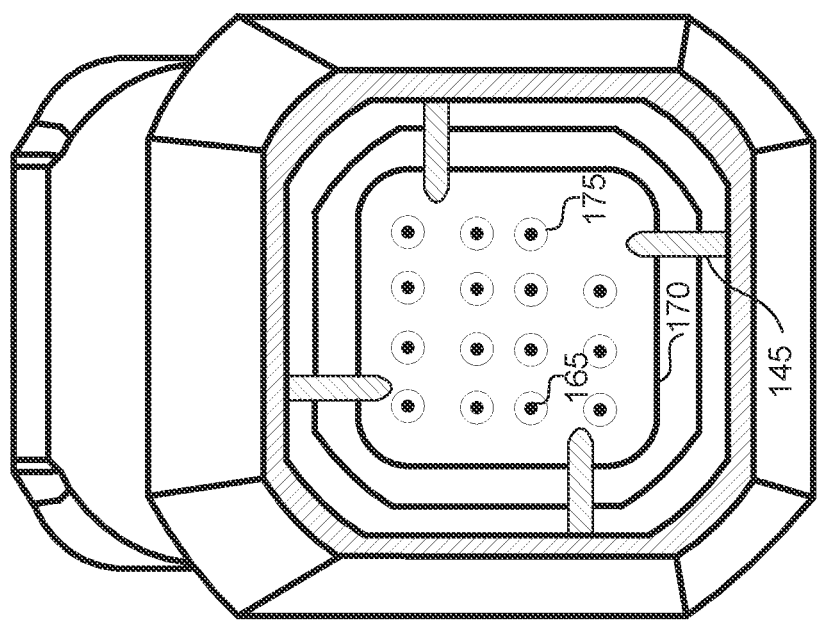
FIG. 1C is a plan view of a distal end of the handpiece and the nozzle in the RF microneedle system of FIG. 1A.

An example RF microneedle system 100 with this enhanced cooling is shown in longitudinal cross-sectional view in FIG. 1A, in a perspective view in FIG. 1B, and a plan distal view in FIG. 1C. A handpiece 105 extends longitudinally to a microneedle housing 110 at a distal end of handpiece 105. Also extending longitudinally with handpiece 105 is a cooling duct 115 having a lumen 120 that receives cooled gas (e.g., air or nitrogen) from a cooled gas source 125. The following discussion will assume that the cooled gas is cooled air without loss of generality. Cooling duct 115 couples (for example, through a magnetic coupling) to a radial extension of a collar or nozzle 130 that circumferentially surrounds microneedle housing 110 such that a distal portion 135 of microneedle housing 110 distally protrudes from a distal end of nozzle 130. Nozzle 130 includes a lumen that extends to an opening 180 at the distal end of nozzle 130 so that the cooled air may exit. Nozzle 130 narrows as it extends distally towards opening 180 from a proximal end of nozzle 130. The cooled air thus is not only directed longitudinally along an outer surface of distal portion 135 but also is directed radially towards a longitudinal central axis of handpiece 105. This radial component of the cooled air as it exits towards opening 180 assists in directing the cooled air into longitudinally directed slots 145 on distal portion 135. Slots 145 open to an interior 160 of distal portion 135 that contains an array of microneedles 165.

Given this radial component of the cooled air as it exits nozzle 130, some cooled air will be directed through slots 145 into the interior 160 to cool microneedles 165. Handpiece 105 includes an actuator (not illustrated) that actuates the microneedles 165 from a retracted or non-actuated position in which the microneedles 165 are contained within the interior 160 of microneedle housing 110 to an extended or actuated position in which the microneedles 165 extend from a distally facing template 170 at a distal end of distal portion 135 so that microneedles 165 may penetrate the skin. Template 170 includes an array of perforations or holes 175 such that each microneedle 165 may extend through a corresponding hole 175 in template 170 when the microneedles 165 are actuated. Note that the term "microneedle" is used herein without limitation to the actual needle diameter. In general, a "microneedle" refers to a needle that is relatively thin so as to more easily pierce the skin in the actuated position. But the length and thickness of a microneedle may be varied depending upon the application.

In addition to the cooling of the microneedles 165, note that opening 180 surrounds a circumference of the distal portion 135 of microneedle housing 110. There is thus a 360 degree of cooling provided to the skin of a patient that faces template 170 from the longitudinal component of the cooled air exiting opening 180. The resulting 360 degrees of cooling advantageously enhances patient comfort. Cooling duct 115 may attach to handpiece 105 through a clip portion 150 that clips about handpiece 105. Nozzle 130 may magnetically couple to a distal end 155 of cooling duct 115 as discussed further herein.

Microneedles 165 may be insulated in some implementations. The energy of an RF source (not illustrated) for exciting the microneedles 165 determines the type of fractional injury. For example, if the tissue being fractionally injured by the RF excitation is heated to 100° C. or greater, the resulting fractional injury is typically denoted as being ablative. If the tissue being fractionally injured by the RF excitation is not heated to 100° C. or greater, the resulting fractional injury is commonly denoted as being non-ablative. There are various forms of non-ablative fractional injury. For example, if the tissue being fractionally injured is heated to greater than 70° C. but less than 100° C., the fractional injury is commonly denoted as a fractional coagulation or tissue necrosis. Should the RF excitation instead heat the tissue being fractionally injured to less than 70° C. but above 40° C., the fractional injury is often denoted as non-immediately destructive tissue heating.

Figure 2A:
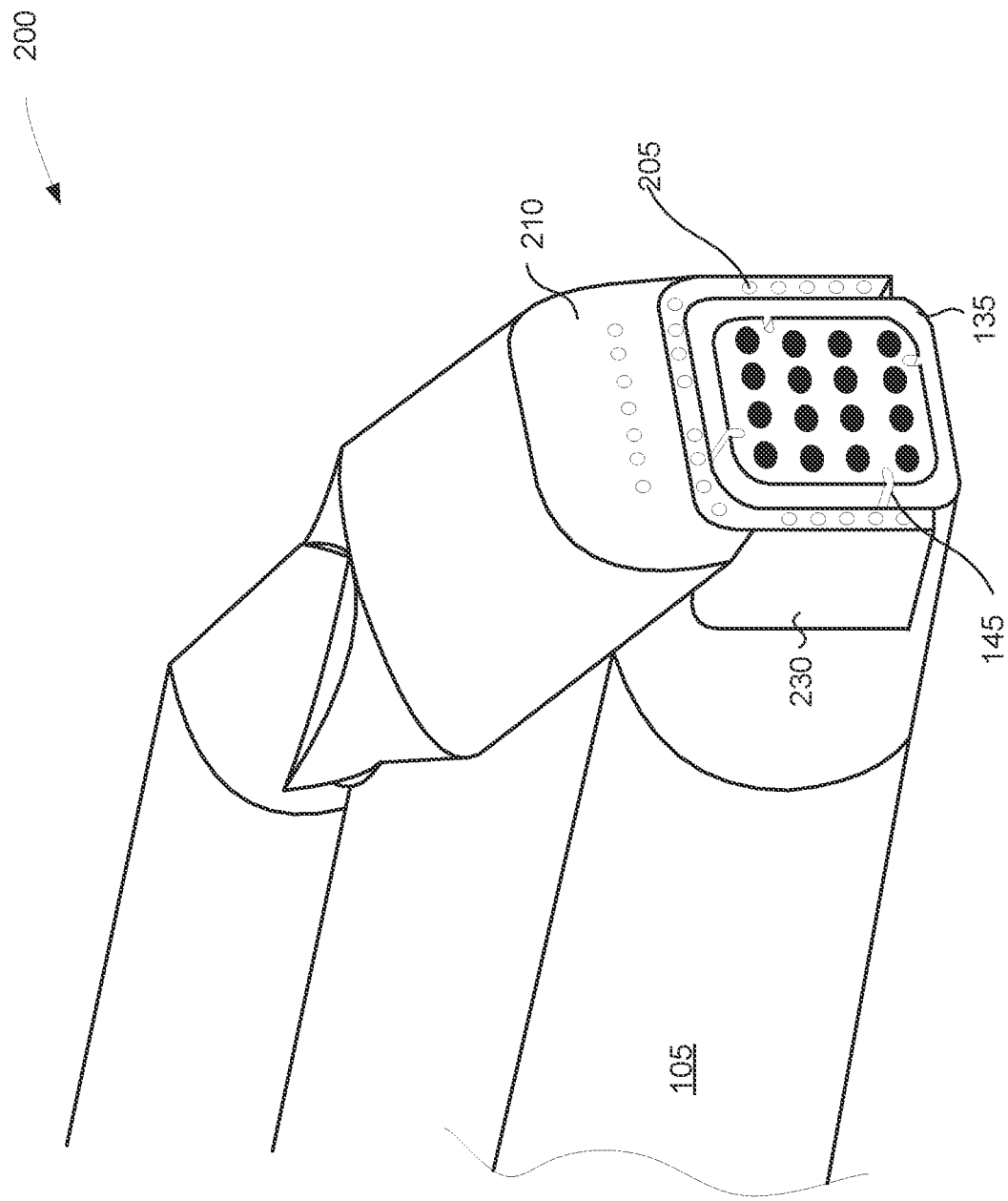
FIG. 2A is a perspective view of an RF microneedle system with approximately 270 degrees of cooling in accordance with an aspect of the disclosure.

Rather than surround the entire circumference of distal portion 135, an alternative nozzle 230 for a microneedle RF system 200 may instead surround a portion of the circumference of distal portion 135 as shown in FIG. 2A. Handpiece 105 in system 200 is arranged as discussed with regard to system 100. Distal portion 135 thus extends distally from a distal end of nozzle 230 and includes slots 145. Nozzle 230 includes a plurality of openings 205 at its distal end and also along a chamfer or sloped edge 210. The partial circumferential extent of nozzle 230 about distal portion 230 is approximately 270 degrees but it will be appreciated that a greater or smaller partial circumferential extent may be used in alternative implementations.

Referring again to nozzle 130, note that opening 180 is continuous with respect to surrounding the entire circumference of distal portion 135. In contrast, openings 205 in nozzle 230 are discrete and spaced apart across the approximately 270 degrees of the partial circumference of distal portion 135. It will be appreciated that nozzle 130 may instead have such discrete openings for the cooled gas to exit. Similarly, nozzle 230 may instead have a continuous opening for its cooled gas to exit.

Figure 2C:
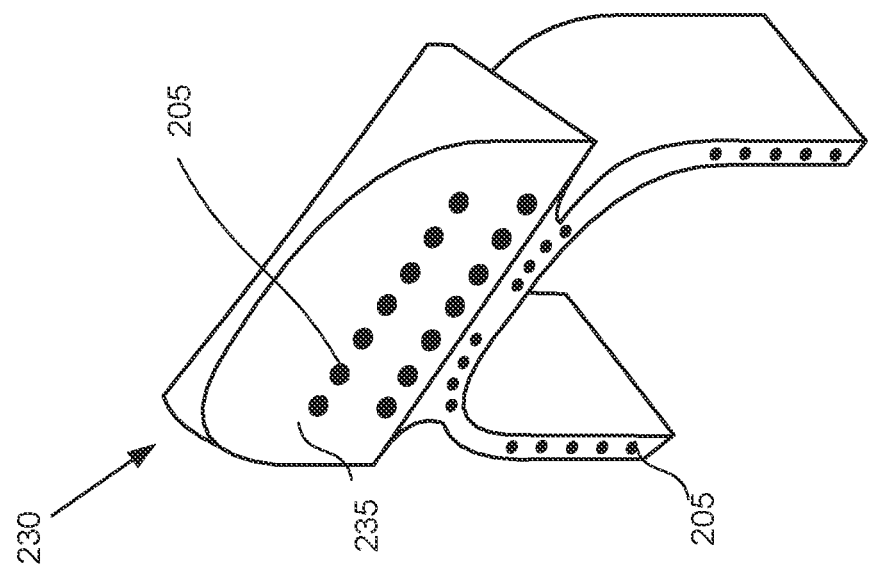
FIG. 2C is a distal perspective view in isolation of the nozzle from the RF microneedle system of FIG. 2A.
Figure 2B:
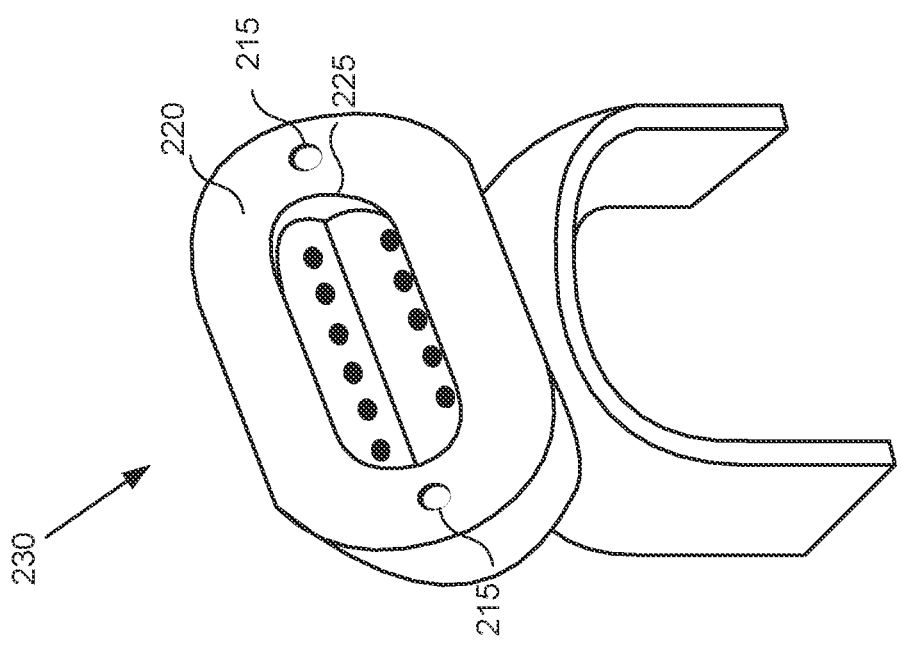
FIG. 2B is a proximal perspective view in isolation of the nozzle from the RF microneedle system of FIG. 2A.

Nozzle 230 is shown in isolation in FIG. 2B and FIG. 2C. A proximal end 220 of nozzle 230 may include magnets 215 for a magnetic coupling to a distal end of the cooling duct (not illustrated). From proximal end 220, a lumen 225 extends to openings 205 on both a distal end of nozzle 230 and also on a chamfered edge 235.

Figure 3:
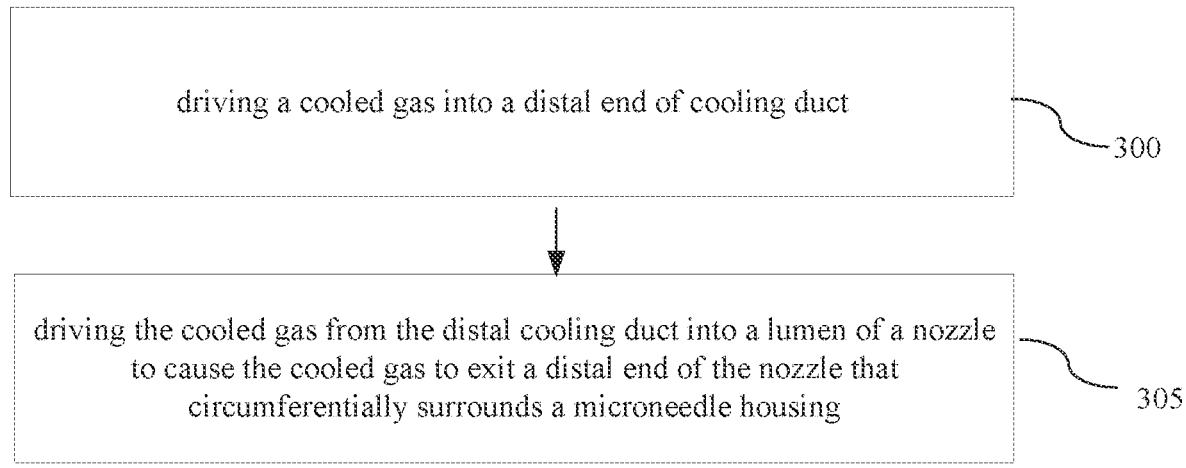
FIG. 3 is a flowchart for an example method of cooling during use of an RF microneedle system in accordance with an aspect of the disclosure.

An example method of cooling of an RF microneedle system will now be discussed with respect to the flowchart of FIG. 3. The method includes an act 300 of driving a cooled gas into a distal end of cooling duct. The driving of cooled air into cooling duct 115 is an example of act 300. The method also includes an act 305 of driving the cooled gas from the distal end of the cooling duct into a lumen of a nozzle to cause the cooled gas to exit a distal end of the nozzle that circumferentially surrounds a microneedle housing. The exiting of the cooled air from circumferential opening 180 in nozzle 130 is an example of act 305.

Those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An RF microneedle system, comprising:
    a handpiece including a microneedle housing at a distal end of the handpiece, the microneedle housing including an interior containing an array of microneedles and including an at least one slot extending longitudinally across the microneedle housing to provide a first opening extending from an outer surface of the microneedle housing to the interior containing the array of microneedles; and
    a nozzle at least partially surrounding a circumference of the microneedle housing, wherein a distal portion of the microneedle housing distally extends from the nozzle and the nozzle includes a lumen open to the at least one slot, the lumen extending from a proximal end of the nozzle to a plurality of second openings at a distal end of the nozzle, and wherein the plurality of second openings at least partially surround the circumference of the microneedle housing, and wherein the nozzle is tapered such that the distal end of the nozzle is narrower than the proximal end of the nozzle.

2. The RF microneedle system of claim 1, further comprising:
    a cooling duct configured to attach to the proximal end of the nozzle, wherein the cooling duct includes a lumen extending from a proximal end of the cooling duct to a distal end of the cooling duct.

3. The RF microneedle system of claim 2, further comprising:
    a cooling gas source configured to drive a cooled gas into the lumen of the cooling duct.

4. The RF microneedle system of claim 3, wherein the cooling gas source is a cooling air source configured to drive cooled air into the lumen of the cooling duct.

5. The RF microneedle system of claim 2, wherein the at least one slot comprises a plurality of slots.

6. The RF microneedle system of claim 2, wherein the cooling duct includes a clip portion configured to clip to the handpiece.

7. The RF microneedle system of claim 1, wherein the lumen is configured to taper towards a central longitudinal axis of the handpiece.

8. A method of operation of an RF microneedle system, comprising:
    driving a cooled gas into a distal end of a cooling duct; and
    driving the cooled gas from the distal end of the cooling duct into a lumen of a nozzle to cause the cooled gas to exit a first opening at a distal end of the nozzle, wherein the first opening circumferentially surrounds a microneedle housing, and to cause the cooled gas to also enter into a second opening that extends from an exterior surface of the nozzle into the microneedle housing to cool an array of microneedles within the microneedle housing.

9. The method of claim 8, wherein driving the cooled gas into the lumen of the nozzle comprising driving cooled air into the lumen of the nozzle from a lumen of the cooling duct.

10. An RF microneedle system, comprising:
    a microneedle housing including a distal portion and a proximal portion; and
    a nozzle having a circumferential opening that surrounds a circumference of the proximal portion of microneedle housing, wherein the distal portion of the microneedle housing extends from a distal end of the nozzle, wherein the distal portion of the microneedle housing includes at least one slot extending longitudinally across the microneedle housing and opening from a lumen of the nozzle into an interior of the microneedle housing, and wherein the nozzle is tapered such that the distal end of the nozzle is narrower than a proximal end of the nozzle.

11. The RF microneedle system of claim 10, further comprising:
    a cooling duct coupled to the lumen of the nozzle; and
    a cooled gas source configured to drive a cooled gas through the cooling duct into the lumen of the nozzle to cause the cooled gas to exit the circumferential opening.

12. The RF microneedle system of claim 11, wherein the cooling gas source is a cooling air source configured to drive cooled air into a lumen of the cooling duct.

13. The RF microneedle system of claim 10, wherein the at least one slot comprises a plurality of slots.

14. The RF microneedle system of claim 13, wherein the plurality of slots comprises four slots.

* * * * *